(12) United States Patent
Kim et al.

(10) Patent No.: US 12,002,400 B2
(45) Date of Patent: Jun. 4, 2024

(54) DISPLAY APPARATUS AND CONTROLLING METHOD THEREOF

(71) Applicant: Samsung Electronics Co., Ltd., Suwon-si (KR)

(72) Inventors: Kihoon Kim, Suwon-si (KR); Doyoung Kim, Suwon-si (KR); Sanghyup Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/901,288

(22) Filed: Sep. 1, 2022

(65) Prior Publication Data
US 2023/0122995 A1 Apr. 20, 2023

Related U.S. Application Data

(63) Continuation of application No. PCT/KR2022/008235, filed on Jun. 10, 2022.

(30) Foreign Application Priority Data

Oct. 20, 2021 (KR) .................. 10-2021-0140580

(51) Int. Cl.
*G09G 3/20* (2006.01)

(52) U.S. Cl.
CPC ..... *G09G 3/2003* (2013.01); *G09G 2310/027* (2013.01); *G09G 2340/16* (2013.01)

(58) Field of Classification Search
CPC ........... G09G 3/2003; G09G 2310/027; G09G 2340/16
See application file for complete search history.

(56) References Cited

U.S. PATENT DOCUMENTS 10,055,187 B2 * 8/2018 Penke .............. H04N 21/41265
10,376,786 B2   8/2019 Lee et al.
(Continued)

FOREIGN PATENT DOCUMENTS

JP   5965434 B1   8/2016
JP   6502589 B1   4/2019
(Continued)

OTHER PUBLICATIONS

International Search Report and written opinion dated Sep. 21, 2022, issued in International Application No. PCT/KR2022/008235.

(Continued)

*Primary Examiner* — Amare Mengistu
*Assistant Examiner* — Jennifer L Zubajlo
(74) *Attorney, Agent, or Firm* — Jefferson IP Law, LLP

(57) ABSTRACT

A display apparatus is provided. The display apparatus includes a display, a user interface, a memory configured to store information regarding an area of interest for each game type, a plurality of light emitting diodes (LEDs) provided on one area of the display and configured to emit light in various colors, and a processor configured to, based on information related to a game type being selected through the user interface, identify an area of interest corresponding to the selected game type based on the information stored in the memory and control a light-emitting state of the plurality of LEDs based on red, green, and blue (RGB) grayscale data of a pixel corresponding to the identified area of interest in a game image provided through the display.

18 Claims, 12 Drawing Sheets

(56) References Cited

U.S. PATENT DOCUMENTS

| | | | |
|---|---|---|---|
| 11,112,107 B2* | 9/2021 | Cho | F21V 33/0052 |
| 11,185,772 B2 | 11/2021 | Lee et al. | |
| 11,715,342 B2* | 8/2023 | Nguyen | G07F 17/3213 |
| | | | 463/20 |
| 2010/0034425 A1* | 2/2010 | Lin | G06T 7/20 |
| | | | 382/103 |
| 2012/0242250 A1 | 9/2012 | Coezijn et al. | |
| 2012/0242251 A1* | 9/2012 | Kwisthout | H04N 9/73 |
| | | | 315/297 |
| 2015/0296215 A1* | 10/2015 | Callahan | H04N 19/136 |
| | | | 375/240.26 |
| 2017/0182416 A1 | 6/2017 | Lee et al. | |
| 2017/0360295 A1 | 12/2017 | Oz et al. | |
| 2019/0065018 A1* | 2/2019 | Keam | G06F 3/041 |
| 2019/0344176 A1 | 11/2019 | Lee et al. | |
| 2021/0225323 A1* | 7/2021 | Furihata | G09G 5/10 |
| 2022/0054938 A1 | 2/2022 | Lee et al. | |
| 2022/0122346 A1* | 4/2022 | Liu | G06N 3/045 |

FOREIGN PATENT DOCUMENTS

| | | |
|---|---|---|
| KR | 10-0756723 B1 | 9/2007 |
| KR | 10-0890937 B1 | 4/2009 |
| KR | 10-2009-0086951 A | 8/2009 |
| KR | 10-2010-0112955 A | 10/2010 |
| KR | 10-1167889 B1 | 7/2012 |
| KR | 10-2012-0117820 A | 10/2012 |
| KR | 10-2012-0128609 A | 11/2012 |
| KR | 10-2021-0003627 A | 1/2021 |
| KR | 10-2021-0009609 A | 1/2021 |
| KR | 10-2021-0083078 A | 7/2021 |
| KR | 10-2438199 B1 | 8/2022 |
| WO | 2017/162539 A1 | 9/2017 |

OTHER PUBLICATIONS

"A light that changes its light according to a game screen," https://m.post.naver.com/viewer/postView.nhn?volumeNo=29876375&memberNo=34059480 Nov. 4, 2020.

* cited by examiner

DISPLAY APPARATUS AND CONTROLLING METHOD THEREOF

CROSS-REFERENCE TO RELATED APPLICATION(S)

This application is a continuation application, claiming priority under § 365(c), of an International application No. PCT/KR2022/008235, filed on Jun. 10, 2022, which is based on and claims the benefit of a Korean patent application number 10-2021-0140580, filed on Oct. 20, 2021, in the Korean Intellectual Property Office, the disclosure of which is incorporated by reference herein in its entirety.

TECHNICAL FIELD

This disclosure relates to a display apparatus and a controlling method thereof. More particularly, the disclosure relates to a display apparatus that provides a lighting effect associated with a content provided to a user and a controlling method thereof.

BACKGROUND ART

Recently, a display apparatus having a light emitting diodes (LED) that is disposed on the side or rear side of a device and emits light in various colors is generally distributed. Such a display apparatus may increase the user's sense of immersion in the content by emitting light of a main color (ambient light) detected by the user through the content. More particularly, consumers who play games are very interested in display apparatuses that provide a lighting effect associated with game contents in order to maximize the satisfaction obtained through the game contents.

However, a prior art display apparatus does not take into consideration the different characteristics of the areas on the screen that the user watches for each game type and thus, there is a problem that the main color detected by the user through the content does not match the color of lighting provided through the LED. Accordingly, there has been a continuous need for a method of providing a lighting effect based on different characteristics of the areas on the screen that the user watches for each game type.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a display apparatus that identifies an area of interest for each game type selected by a user and controls a light-emitting state of a plurality of light emitting diodes (LEDs) based on red, green, and blue (RGB) grayscale data included in the area of interest of a game image and a controlling method thereof.

Additional aspects will be set forth in part in the description which follows and, in part, will be apparent from the description, or may be learned by practice of the presented embodiments.

Technical Solution

In accordance with an aspect of the disclosure, a display apparatus is provided. The display apparatus includes a display, a user interface, a memory configured to store information regarding an area of interest for each game type, a plurality of LEDs provided on one area of the display and configured to emit light in various colors, and a processor configured to, based on information related to a game type being selected through the user interface, identify an area of interest corresponding to the selected game type based on the information stored in the memory and control a light-emitting state of the plurality of LEDs based on RGB grayscale data of a pixel corresponding to the identified area of interest in a game image provided through the display.

The processor may be configured to obtain RGB grayscale data of a pixel included in the area of interest in units of a predetermined first time section and control a light-emitting state of the plurality of LEDs for a predetermined second time section based on the obtained RGB grayscale data.

The processor may be configured to obtain an average value of an R grayscale value, an average value of a G grayscale value and an average value of a B grayscale value of respective pixels included the area of interest and control a light-emitting state of the plurality of LEDs based on the R average value, the G average value and the B average value.

The memory may be configured to store a representative light-emitting value for each of a plurality of pixel value ranges, and the processor may be configured to identify a range to which a pixel value of the area of interest belongs from among the plurality of pixel value ranges stored in the memory based on RGB grayscale data included in the area of interest and control a light-emitting state of the plurality of LEDs based on a representative light-emitting value corresponding to the identified range.

The plurality of LEDs may include a first LED provided on a bezel area of the display and a second LED provided on a rear side of the display, and the processor may be configured to identify a first range and a second range to which a pixel value of the area of interest belongs from among the plurality of pixel value ranges based on RGB grayscale data included in the area of interest, control a light-emitting state of the first LED based on a first representative light-emitting value corresponding to the first range, and control a light-emitting state of the second LED based on a second representative value corresponding to the second range.

The processor may be configured to obtain first RGB grayscale data included in an area of interest of a first fame included in the game image and second RGB grayscale data included in an area of interest of a second frame, and based on a difference between a pixel value included in the second frame and a pixel value included in the first frame being equal to or greater than a threshold value based on the first RGB grayscale data and the second RGB grayscale data, control a light-emitting state of the plurality of LEDs based on a pixel value included in the second frame.

The information regarding an area of interest for each game type may include information regarding different locations of an image for each game type, and the different locations of the image may include at least one of a center area of the image, a lower left area or a lower right area.

The processor may be configured to, based on a user command for changing an area of interest of a specific game type being input, update information regarding an area of interest corresponding to the specific game type stored in the memory based on the user command.

The processor may be configured to control at least one of a color or a brightness of the plurality of LEDs based on RGB grayscale data of a pixel corresponding to the identified area of interest.

In accordance with another aspect of the disclosure, a controlling method is provided. The controlling method includes, based on information related to a game type being selected, identifying an area of interest corresponding to the selected game type based on information regarding an area of interest for each game type and driving a plurality of LEDs based on RGB grayscale data of a pixel corresponding to the identified area of interest in a game image provided through a display.

The driving a plurality of LEDs may include obtaining RGB grayscale data of a pixel included in the area of interest in units of a predetermined first time section and driving the plurality of LEDs for a predetermined second time section based on the obtained RGB grayscale data.

The driving a plurality of LEDs may include obtaining an average value of an R grayscale value, an average value of a G grayscale value and an average value of a B grayscale value of respective pixels included the area of interest and driving the plurality of LEDs based on the R average value, the G average value and the B average value.

The driving a plurality of LEDs may include identifying a range to which a pixel value of the area of interest belongs from among the plurality of pixel value ranges based on RGB grayscale data included in the area of interest and driving the plurality of LEDs based on a representative light-emitting value corresponding to the identified range.

The plurality of LEDs may include a first LED provided on a bezel area of the display and a second LED provided on a rear side of the display, and the driving a plurality of LEDs may include identifying a first range and a second range to which a pixel value of the area of interest belongs from among the plurality of pixel value ranges based on RGB grayscale data included in the area of interest, driving the first LED based on a first representative light-emitting value corresponding to the first range and driving the second LED based on a second representative value corresponding to the second range.

Effect of Invention

According to various embodiments of the disclosure, a display apparatus may provide a lighting effect based on RGB grayscale data included in an area of interest, thereby increasing a user sense of immersion in a game content.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
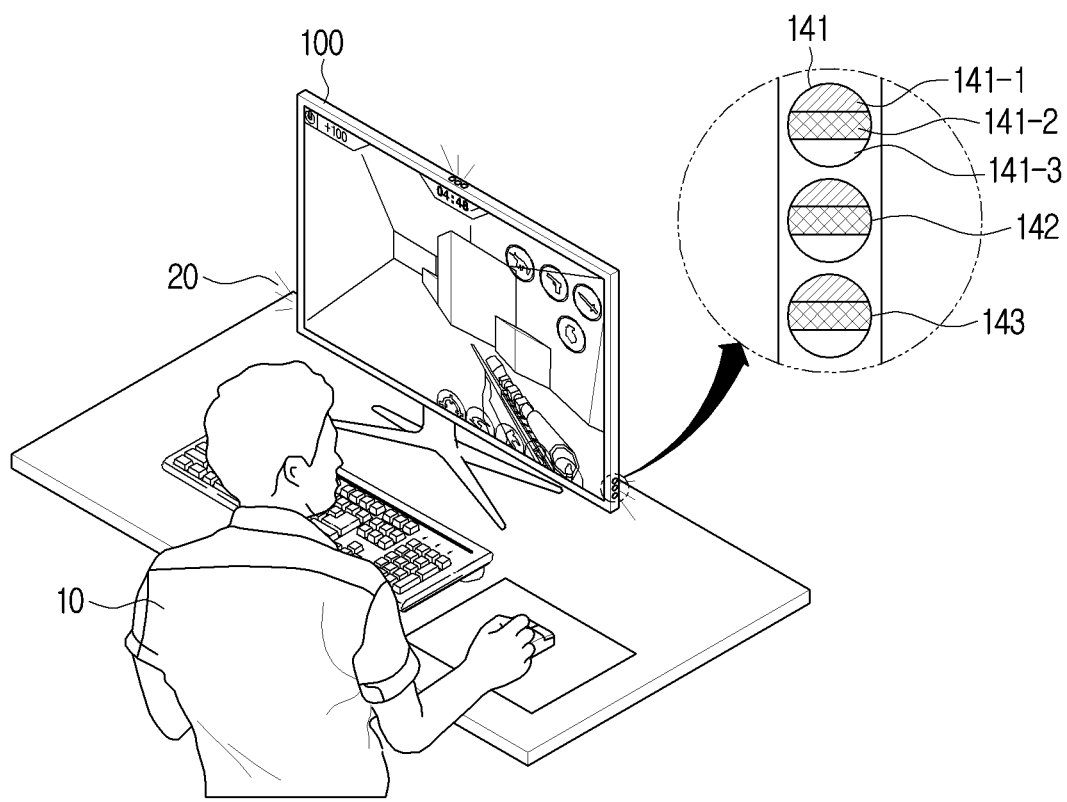
FIG. 1 is a view provided to schematically illustrate an operation of providing a lighting effect of a display apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure based on functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in a corresponding description portion of the disclosure. Therefore, the terms used in the disclosure should be defined based on the meaning of the terms and the contents throughout the disclosure rather than simple names of the terms.

In the disclosure, an expression "have," "may have," "include," "may include," or the like, indicates an existence of a corresponding feature (for example, a numerical value, a function, an operation, a component, such as a part, or the like), and does not exclude an existence of an additional feature.

The expression "at least one of A and/or B" should be understood to represent either "A" or "B" or any one of "A and B."

Expressions, such as "first," or "second," used in the disclosure may modify various components regardless of order and/or importance, and are used to distinguish one component from another component, and do not limit the corresponding components.

When it is mentioned that any component (e.g., a first component) is (operatively or communicatively) coupled with/to or is connected to another component (e.g., a second component), it is to be understood that any component is directly coupled to another component or may be coupled to another component through another component (e.g., a third component).

It should be further understood that the term "include" or "constituted" used in the application specifies the presence of features, numerals, operations, components, parts mentioned in the specification, or combinations thereof, but do not preclude the presence or addition of one or more other features, numerals, operations, components, parts, or combinations thereof.

In the disclosure, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented as at least one processor (not illustrated) except for a 'module' or an 'unit' that needs to be implemented by specific hardware.

In the disclosure, a term "user" may be a person that receives a content through the display apparatus, but it is not limited thereto.

FIG. 1 is a view provided to schematically illustrate an operation of providing a lighting effect of a display apparatus according to an embodiment of the disclosure.

Referring to FIG. 1, a display apparatus 100 may provide a user 10 with a content. For example, the display apparatus 100 may provide a game content, but is not limited thereto.

The display apparatus 100 may be implemented as various types of apparatuses, such as a digital television (TV), a digital versatile disc (DVD) player, a Blu-ray disc player, a game console, a network TV, a smart TV, an Internet TV, a web TV, an Internet protocol television (IPTV), signage, a personal computer (PC), a head mounted display (HMD), a wearable device, or the like, but is not limited thereto.

The display apparatus 100 may include a plurality of light emitting diodes (LEDs) on one side of the apparatus. Here, each of a plurality of LEDs (141, 142, 143, or the like) may include a plurality of sub-LEDs that emit light of different colors. For example, one LED 141 may include R LED 141-1 emitting red light, G LED 141-2 emitting green light and B LED 141-3 emitting blue light. Although FIG. 1 illustrates three types of sub-LEDs, the display apparatus 100 is not limited thereto. The display apparatus 100 may further include W LED emitting white light.

The display apparatus 100, according to an embodiment of the disclosure, may control a light-emitting state of the plurality of LEDs (141, 142, 143, or the like) based on RGB grayscale data corresponding to a game content and as a result, the display apparatus 100 may provide the user 10 with a lighting effect 20 associated with the game content.

Meanwhile, when the display apparatus 100 provides the lighting effect 20 based on red, green, and blue (RGB) grayscale data included in the entire game image, the light-emitting period of the plurality of LEDs (141, 142, 143, or the like) becomes longer due to an excessive amount of data to be processed by the display apparatus 100 and accordingly, there is a problem that it becomes difficult for the display apparatus 100 to provide the lighting effect 20 that reflects a frame change of the game image in real time.

Thus, the display apparatus 100, according to an embodiment of the disclosure, may identify an area of interest 30 corresponding to a game type selected by the user in the game image and provide the lighting effect 20 based on RGB grayscale data corresponding to the identified area of interest 30. Here, the area of interest may be an area including at least one of an area that the user 10 watches in the game image for a long period of time or an area where important information regarding the game content is displayed, but is not limited thereto.

Hereinafter, various embodiments of the disclosure for identifying an area of interest for each game type selected by the user and providing a lighting effect based on RGB grayscale data included in the area of interest of the game image will be described.

Figure 2:
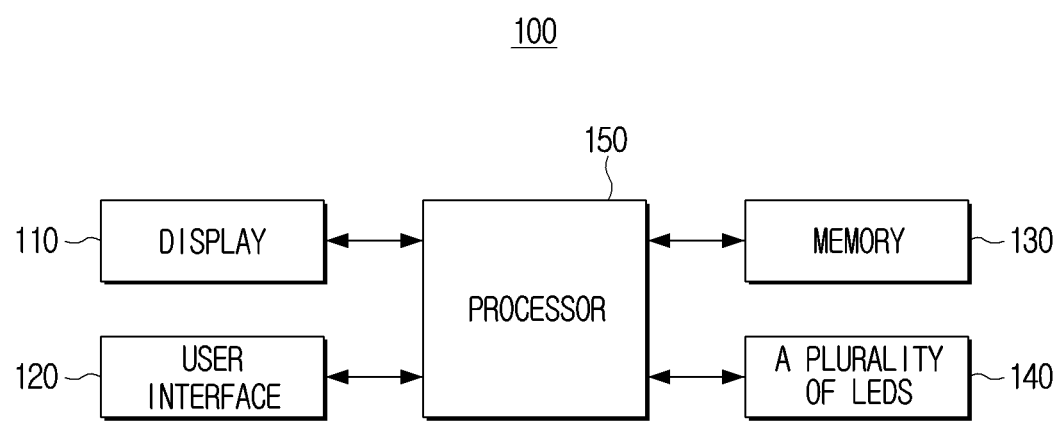
FIG. 2 is a block diagram provided to illustrate a configuration of a display apparatus according to an embodiment of the disclosure.

FIG. 2 is a block diagram provided to illustrate a configuration of a display apparatus according to an embodiment of the disclosure.

Referring to FIG. 2, the display apparatus 100 may include a display 110, a user interface 120, a memory 130, a plurality of LEDs 140, and a processor 150.

The display 110 is configured for the display apparatus 100 to provide a user with an image related to a content. The display 110 may be implemented as displays in various forms, such as liquid crystal display (LCD), organic light emitting diodes (OLED) display, quantum dot light-emitting diodes (QLED) display, plasma display panel (PDP), or the like. The display 110 may also include a driving circuit, a backlight unit, or the like, that can be implemented in the form of a thin-film transistor (TFT), low temperature poly silicon (LTPS) TFT, organic TFT (OTFT), or the like. Meanwhile, the display 110 may be implemented as a flexible display, a three-dimensional (3D) display, or the like.

The display 110 includes a plurality of pixels, and the plurality of pixels may include R, G and B sub-pixels that emit red light, green light and blue light.

The user interface 120 is a component involved in the display apparatus 100 performing an interaction with the user. For example, the user interface 120 may include at least one of a touch sensor, a motion sensor, a button, a jog dial, a switch, or a microphone, but is not limited thereto.

In addition, when the user controls the display apparatus 100 remotely, the user interface 120 may include a receiver for receiving a control signal transmitted from a remote control device operated by the user.

The user may select information related to a game type through the user interface 120. Here, the information related to a game type may include information regarding the type of game content provided through the display apparatus 100 or an area of interest corresponding to the type of game content, but is not limited thereto.

The memory 130 may store data necessary for various embodiments of the disclosure. The memory 130 may be implemented in a form of a memory embedded in the display apparatus 100 or in a form of a memory attachable to and detachable from the display apparatus 100, depending on a data storing purpose. For example, data for driving the display apparatus 100 may be stored in the memory embedded in the display apparatus 100, and data for an extension function of the display apparatus 100 may be stored in the memory attachable to and detachable from the display apparatus 100. Meanwhile, the memory embedded in the display apparatus 100 may be implemented by at least one of a volatile memory (for example, a dynamic random-access memory (RAM) (DRAM), a static RAM (SRAM), or a synchronous dynamic RAM (SDRAM)), a non-volatile memory (for example, a one-time programmable ROM (OTPROM), a programmable ROM (PROM), an erasable and programmable ROM (EPROM), an electrically erasable programmable ROM (EEPROM), a mask ROM, a flash ROM, a flash memory (for example, a NAND flash or a NOR flash), a hard drive, or a solid state drive (SSD)). In addition, the memory attachable to and detachable from the display apparatus 100 may be implemented by a memory card (for example, a compact flash (CF), a secure digital (SD), a micro secure digital (micro-SD), a mini secure digital (mini-SD), an extreme digital (xD), or a multi-media card (MMC)), an external memory (for example, a universal serial bus (USB) memory) connectable to a USB port, or the like.

The memory, according to an embodiment of the disclosure, may store information regarding an area of interest for each game type. Here, the information regarding an area of interest for each game type may include information regarding different locations of an image for each game type, and the different locations of an image may include at least one of a center area, a lower left area or a lower right area.

The plurality of LEDs 140 may emit light of various colors. For example, the plurality of LEDs 140 may include R LED emitting red light, G LED emitting green light and B LED emitting blue light. In addition, the plurality of LEDs 140 may further include W LED emitting white light.

The processor 150 controls the overall operations of the display apparatus 100. Specifically, the processor 150 may be connected to each component of the display apparatus 100 to comprehensively control the operations of the display apparatus 100. For example, the processor 150 may be connected to the display 110, the user interface 120, the memory 130, and the plurality of LEDs 140 and control the operations of the display apparatus 100.

According to an embodiment of the disclosure, the processor 150 may be referred to as various names, such as a digital signal processor (DSP), a microprocessor, a central processing unit (CPU), a micro controller unit (MCU), a micro processing unit (MPU), a neural processing unit (NPU), a controller, an application processor (AP), or the like, but in this disclosure, it will be referred to as the processor 150.

The processor 150 may be implemented as system on chip (SoC) or large scale integration (LSI), and it may also be implemented in the form of a field programmable gate array (FPGA). In addition, the processor 150 may include a volatile memory, such as SRAM, or the like.

According to an embodiment of the disclosure, when information regarding a game type is selected through the user interface 120, the processor 150 may identify an area of interest corresponding to the selected game type based on information regarding an area of interest for each game type stored in the memory 130.

The area of interest may be an area corresponding to different locations of an image for each game type, and the area of interest, according to an embodiment of the disclosure, may be an area including at least one of a center area, a lower left area or a lower right area. The area of interest may be an area in the shape of at least one of a circle, an ellipse or a rectangle, but is not limited thereto.

In addition, the processor 150 may obtain RGB grayscale data of a pixel corresponding to the identified area of interest in a game image provided through the display 110. Here, the RGB grayscale data may be data including grayscale values for driving R, G and B sub-pixels included in the display 110. For example, if an image has 256 levels of gray level for each RGB color signal, the RGB grayscale data may include numerical values ranging from 0 to 255 corresponding to each of the R, G and B sub-pixels.

The processor 150, according to an embodiment of the disclosure, may obtain RGB grayscale data included in an area of interest in units of a predetermined first time section. For example, the processor 150 may obtain RGB grayscale data included in the area of interest every 0.1 seconds. As a result, the processor 150 may obtain a set of RGB data including RGB data of a reference time point regarding the area of interest, RGB data when 0.1 second has elapsed from the reference time point, RGB data when 0.2 seconds have elapsed from the reference time point, or the like.

In addition, the processor 150 may control the light-emitting state of the plurality of LEDs 140 based on the obtained RGB grayscale data. Specifically, the processor 150 may control at least one of the color or the brightness of the plurality of LEDs 140 based on the RGB grayscale data of a pixel corresponding to the identified area of interest. Meanwhile, the processor 150 may further obtain brightness data regarding the area of interest of the image in addition to the RGB grayscale data to control the color and the brightness of the plurality of LEDs 140 based on the RGB grayscale data and the brightness data.

The processor 150, according to an embodiment of the disclosure, may control the light-emitting state of the plurality of LEDs 140 for a predetermined second time section based on the obtained RGB grayscale data. Here, the second time may be a minimum unit of time during which each of the plurality of LEDs emits a constant color or light of constant brightness. For example, the processor 150 may adjust the color or the brightness of the light emitted by the plurality of LEDs every 0.1 second (the first time) based on the obtained RGB data set.

In addition, the processor 150 may obtain the average value of the R grayscale value, the average value of the G grayscale value and the average value of the B grayscale value of pixels included in the area of interest, and control the light-emitting state of the plurality of LEDs 140 based on the obtained RGB average values.

Meanwhile, the memory 130 may store a representative light-emitting value for each pixel value range. Here, the pixel value may include an RGB grayscale value for controlling a plurality of pixels included in the display 110, but is not limited thereto.

The processor 150 may identify a range to which a pixel value of the area of interest belongs from among a plurality of pixel value ranges stored in the memory 130 based on the RGB grayscale data included in the area of interest, and control the light-emitting state of the plurality of LEDs based on the representative light-emitting value corresponding to the identified range.

Here, the plurality of LEDs 140 may include a first LED provided on a bezel area of the display 110 and a second LED provided on a rear side of the display 110. The locations of the first LED and the second LED are not limited to the above, but in this disclosure, it is assumed that the first LED is provided on a bezel area of the display 110 and the second LED is provided on a rear side of the display 110 for convenience of explanation of the operation of the display apparatus 100.

The processor 150 may identify each of a first range and a second range to which a pixel value of the area of interest belongs from among a plurality of pixel value ranges based on RGB grayscale data included in the area of interest. For example, the processor 150 may identify each pixel value range to which a plurality of pixels included in the area of interest belong, and identify a pixel value range to which the most pixels belong as the first range and a pixel value range to which the next most pixels belong as the second range.

In addition, the processor 150 may control the light-emitting state of the first LED based on the first representative light-emitting value corresponding to the first range and control the light-emitting state of the second LED based on the second representative light-emitting value corresponding to the second range. In other words, the processor 150 may provide two lighting effects related to the game content displayed through the area of interest. In addition, the plurality of LEDs 140 may further include additional LEDs, such as the third LED and the fourth LED provide on the other side, and the processor 150 may provide a plurality of lighting effects by identifying a plurality of pixel value ranges corresponding to each of the plurality of LEDs 140.

Further, the processor 150 may obtain the first RGB grayscale included in the area of interest of the first frame included in the game image and the second RGB grayscale data included in the area of interest of the second frame. If a difference between a pixel value included in the second frame and a pixel value included in the first frame is equal to or greater than a threshold value based on the first RGB grayscale data and the second RGB grayscale data, the processor 150 may control the light-emitting state of the plurality of LEDs 140 based on the pixel value included in the second frame.

In addition, when a user command to change an area of interest of a specific game type, the processor 150 may update information regarding the area of interest corresponding to the specific game type stored in the memory 130 based on the user command. Here, the update may refer to an operation of storing information regarding the area of interest of which size or location has been changed according to the user command in the memory 130.

Figure 3A:
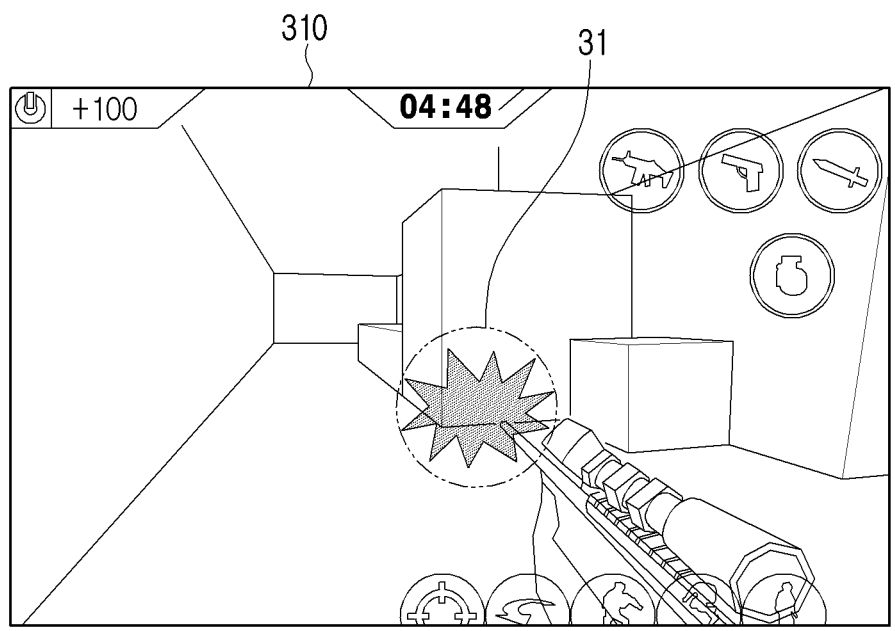
FIGS. 3A and 3B are views provided to illustrate an area of interest for each game type according to various embodiments of the disclosure.
Figure 3B:
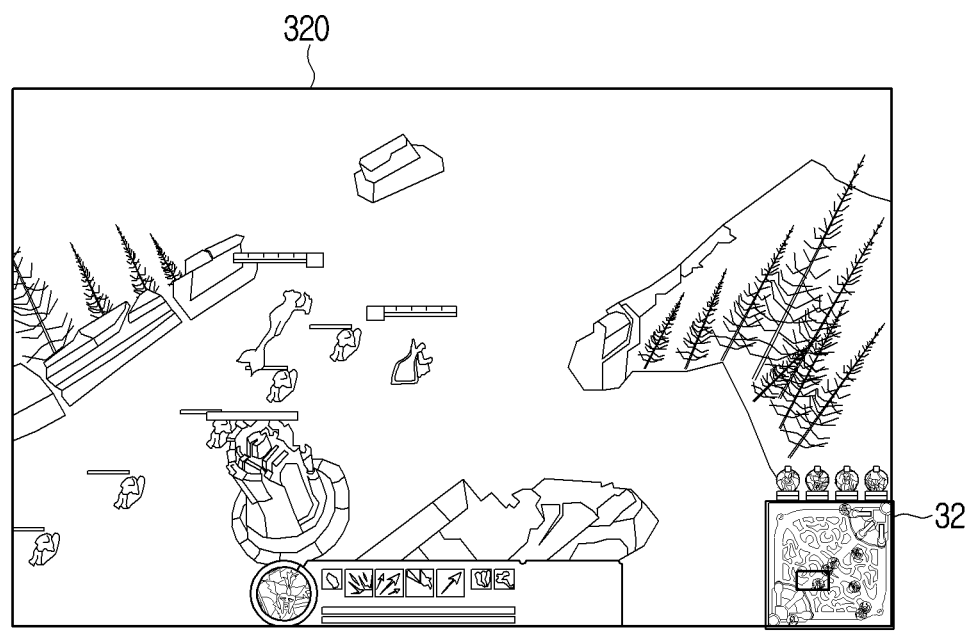

FIGS. 3A and 3B are views provided to illustrate an area of interest for each game type according to various embodiments of the disclosure.

The user may select information regarding the type of game he or she wants to play through the user interface 120 before playing the game.

Referring to FIG. 3A, it illustrates an area of interest 31 identified by the display apparatus 100 when a first person shooter (FPS) content 310 is provided. In the case of FPS, the user may react sensitively to a shooting effect generated from a muzzle located at the center of the screen. In addition, considering the characteristics of FPS in which an aiming point is located at the center of screen, it is common that effects, such as bleeding occur in the center area of the screen when a bullet hits a target.

Accordingly, the memory 130 may store information regarding the area of interest located at the center of the screen for the FPS type, and when the user selects information related to the FPS type through the user interface 120, the processor 150 may identify the center area of the game image 310 as the area of interest 31.

Meanwhile, other than the FPS type, as for other game types where the user's attention is concentrated on the center area of the screen, information regarding the area of interest located at the center area of the image may be stored in the memory 130, and when such a game is selected, the processor 150 may identify the center area of the game image as the area of interest.

Referring to FIG. 3B, it illustrates an area of interest 32 identified by the display apparatus 100 when a multiplayer online battle arena (MOBA) content 320 is provided. In the case of MOBA, the user may react sensitively to a warning effect displayed on a mini map located in a lower area of the screen.

Accordingly, with respect to the MOBA type, the memory 130 may store information regarding an area of interest located in at least one of a lower left area or a lower right area of the screen, and when the user selects information regarding the MOBA type through the user interface 120, the processor 150 may identify at least one of the lower left area or the lower right area of the game image 320 as the area of interest 32.

Meanwhile, other than the MOBA type, as for other game types where the user's attention is concentrated on the lower area of the screen, information regarding the area of interest located at the lower area of the image may be stored in the memory 130, and when such a game is selected, the processor 150 may identify a part of the lower area of the game image as the area of interest.

Figure 4:
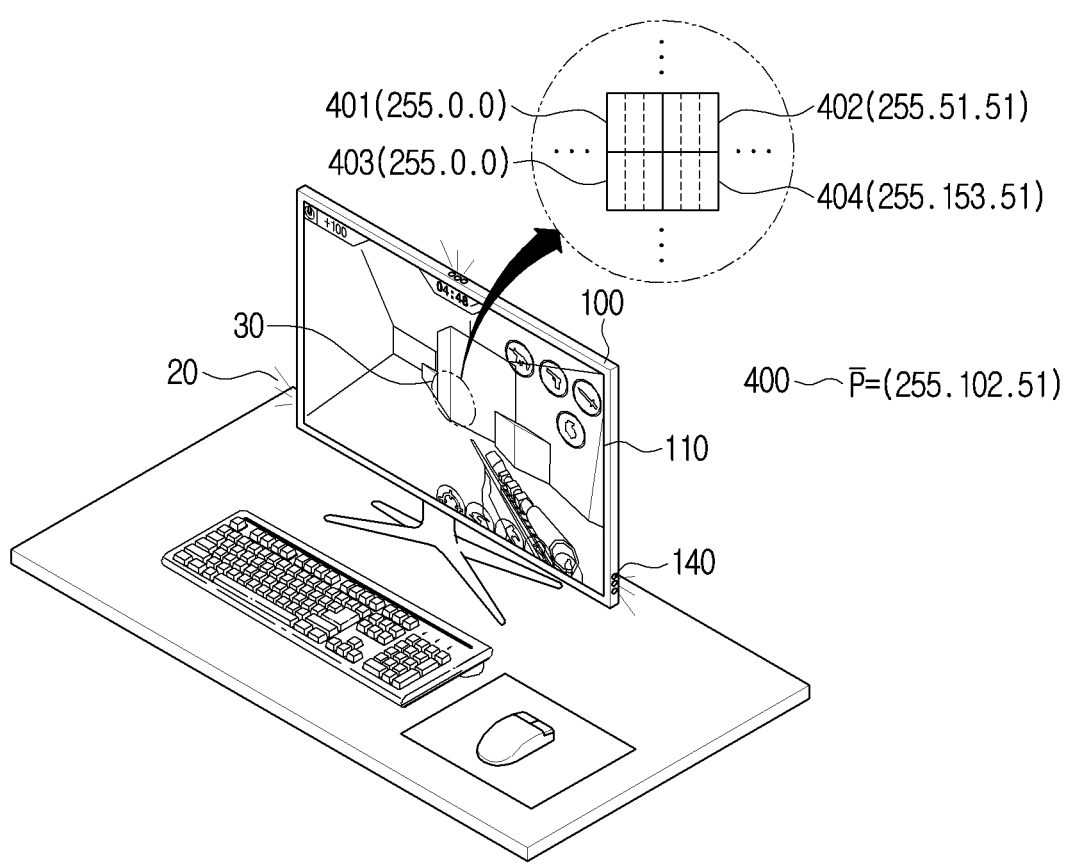
FIG. 4 is a view provided to illustrate an operation of providing a lighting effect based on an average value of a red, green, and blue (RGB) grayscale value of a display apparatus according to an embodiment of the disclosure.

FIG. 4 is a view provided to illustrate an operation of providing a lighting effect based on an average value of an RGB grayscale value of a display apparatus according to an embodiment of the disclosure.

Referring to FIG. 4, the display apparatus 100 may provide a content of the FPS type. The processor 150 may identify the center area of an image as the area of interest 30 and obtain RGB grayscale data of pixels included in the identified area of interest 30.

For example, a first pixel 401 from among a plurality of pixels included in the area of interest 30 may have an RGB grayscale value of (255, 0, 0), and a second pixel to a fourth pixel (402 to 404) may have an RGB grayscale value of (255, 51, 51), (255, 0, 0) and (255, 153, 51), respectively. The processor 150 may obtain RGB grayscale values corresponding to a plurality of pixels in the area of interest 30 including the first to fourth pixels (401 to 404) and obtain the average value of the R grayscale value, the average value of the G grayscale value and the average value of the B grayscale value of each of the plurality of pixels.

The processor 150, according to an embodiment of the disclosure, may obtain the average RGB grayscale value 400 of (255, 102, 51), and control the light-emitting state of the plurality of LEDs 140 based on the obtained average RGB grayscale value 400.

As a result, the display apparatus 100 may provide the lighting effect 20 corresponding to the average value of at least one of a color or a brightness felt by the user through the content displayed on the area of interest 30.

Figure 5A:
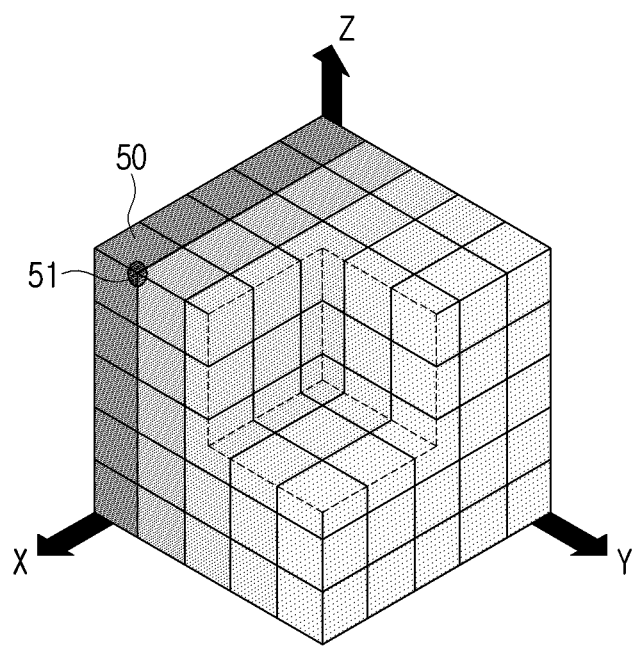
FIGS. 5A and 5B are views provided to illustrate an operation of providing a lighting effect based on a representative light-emitting value of a display apparatus according to various embodiments of the disclosure.
Figure 5B:
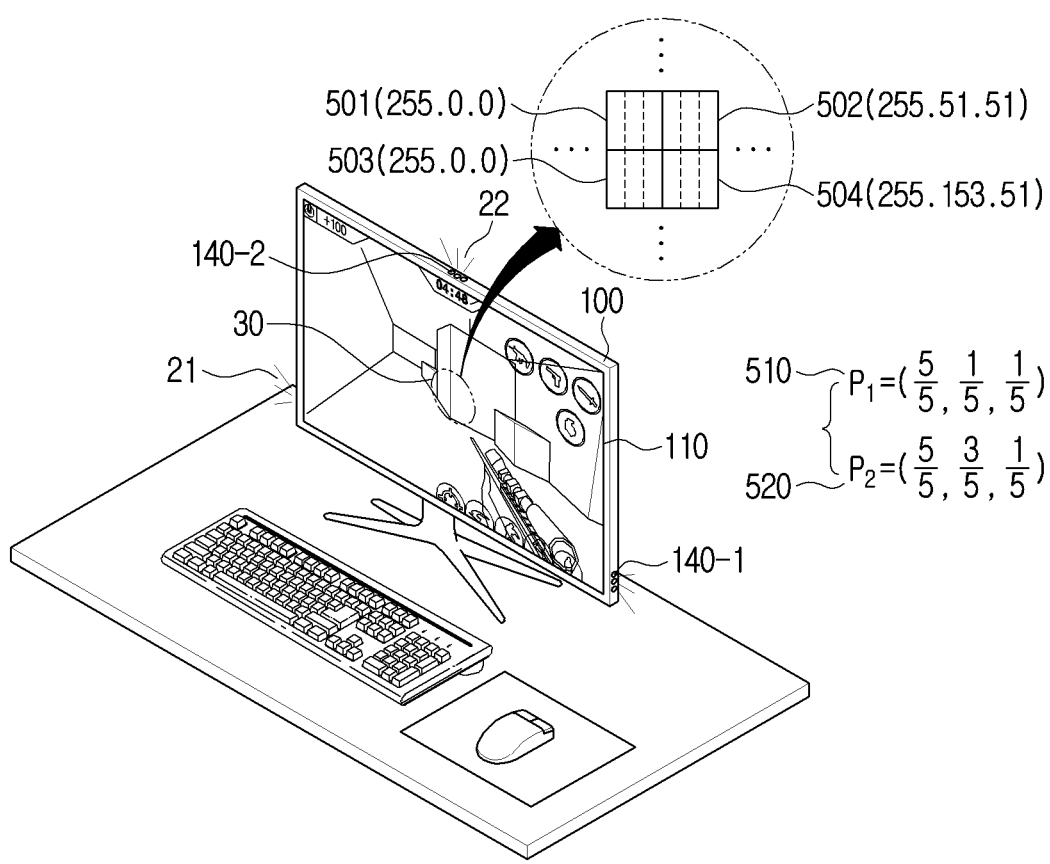

FIGS. 5A and 5B are views provided to illustrate an operation of providing a lighting effect based on a representative light-emitting value of a display apparatus according to various embodiments of the disclosure.

Referring to FIG. 5A, the colors that can be represented through three colors of R, G and B may be divided into a plurality of sections according to a certain standard. For example, when the grayscale values of R, G and B are divided into 5 equal parts, the colors that can be represented through the three colors of R, G and B are divided into 125 sections.

Assuming that the X axis of the RGB color space corresponds to the R grayscale value, the Y axis corresponds to the G grayscale value, and the Z axis corresponds to the B grayscale value, the memory 130 may store information regarding the RGB color space which is divided into a plurality of sections according to a certain standard and representative light-emitting values corresponding to the R, G and B grayscale values of a point 51 in the color space having the largest R, G and B grayscale values in a corresponding section 50 in relation to a specific section 50 in the color space.

Referring to FIG. 5B, the display apparatus 100 may provide a content of an FPS type. The processor 150 may identify a center area of an image as the area of interest 30, and obtain grayscale data of pixels included in the identified area of interest 30.

For example, a first pixel 501 from among the plurality of pixels included in the area of interest 30 may have the RGB grayscale value of (255, 0, 0), second to fourth pixels (502 to 504) may have the RGB grayscale values of (255, 51, 51), (255, 0, 0) and (255, 153, 51), respectively. The processor 150 may obtain RGB grayscale values corresponding to the plurality of pixels in the area of interest 30 including the first to fourth pixels (501 to 504) and identify each of the sections to which the RGB grayscale values corresponding to the plurality of pixels belong based on the information stored in the memory 130.

The processor 150 may identify a section including the most RGB grayscale values corresponding to the plurality of pixels included in the area of interest from among the plurality of sections dividing the color space as a first section, identify a section including the next most RGB grayscale values after the first section as a second section, and identify each of the representative light-emitting values of the first and second sections. For example, the processor 150 may identify a representative light-emitting value P1 (510) of the first section as (R=5/5, G=1/5, B=1/5) and a representative light-emitting value P2 (520) of the second section as (R=5/5, G=3/5, B=1/5), and control the light-emitting state of the plurality of LEDs 140 based on the identified representative light-emitting value 510 of the first section and the identified representative light-emitting value 520 of the second section.

Specifically, the display apparatus 100 may include the first LED 140-1 provided on a bezel area of the display 110 and the second LED 140-2 provided on a rear side of the display 110, and the processor 150 may control the light-emitting state of the first LED 140-1 based on the representative light-emitting value 510 of the first section and the light-emitting state of the second LED 140-2 based on the representative light-emitting value 520 of the second section.

Through the above, the display apparatus 100 may provide two lighting effects 21, 22 corresponding to two major color types felt by the user through the content displayed on the area of interest 30.

Figure 6:
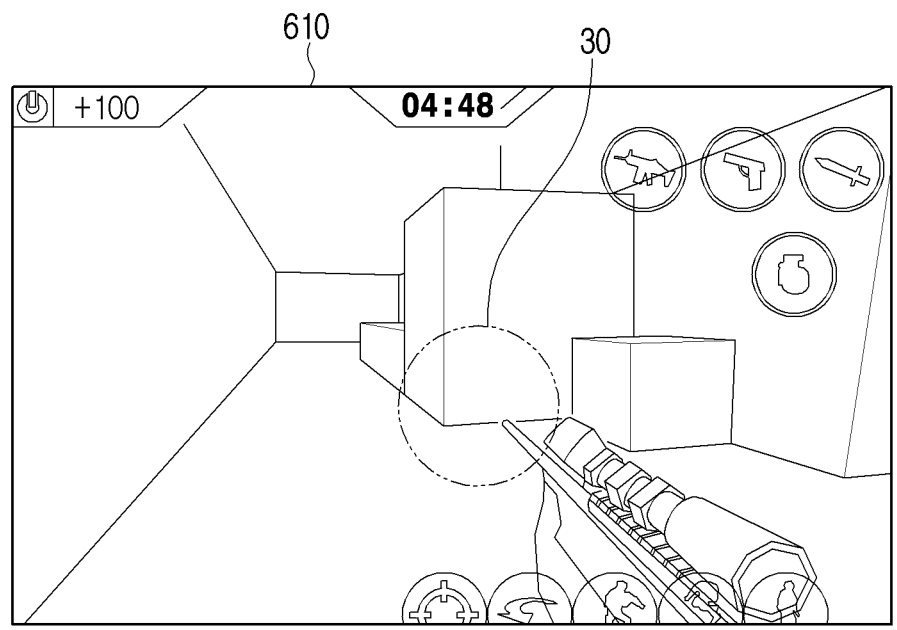
FIG. 6 is a view provided to illustrate an operation of providing a lighting effect based on a change in an RGB grayscale value for each frame of a display apparatus according to an embodiment of the disclosure.
Figure 6:
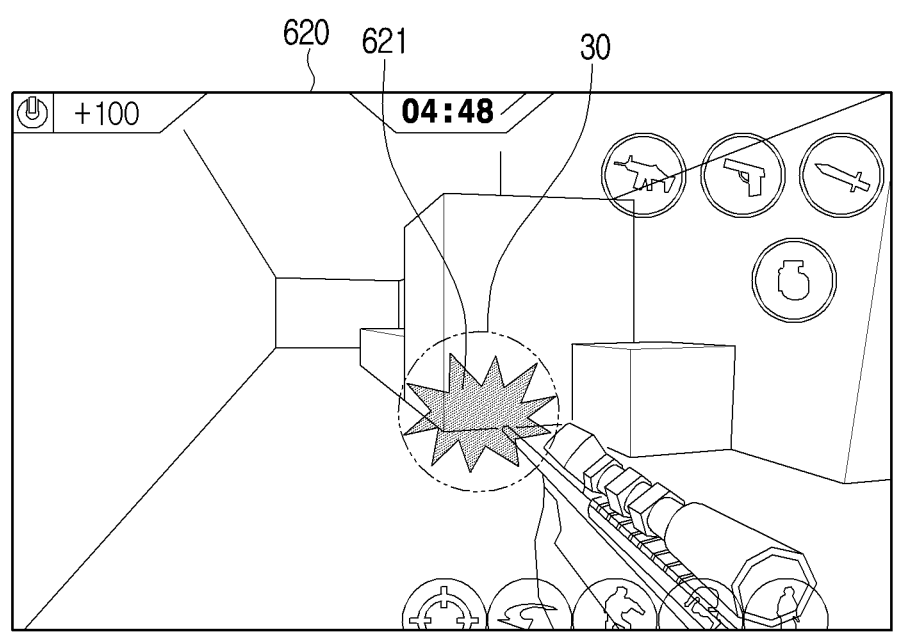

FIG. 6 is a view provided to illustrate an operation of providing a lighting effect based on a change in an RGB grayscale value for each frame of a display apparatus according to an embodiment of the disclosure.

Referring to FIG. 6, the processor 150 may obtain the first RGB grayscale data included in the area of interest 30 of a first frame 610 included in the game image of the FPS type and the second RGB grayscale data included in the area of interest 30 of the second frame 620. In addition, the processor 150 may identify a difference between a pixel value included in the second frame 620 and a pixel value included in the first frame 610 based on the first RGB grayscale data and the second RGB grayscale data.

In the FTS-type game, when only the player's viewpoint is moved in a state in which shooting is not made, the difference between the RGB grayscale values included in the area of interest of the two adjacent frames (i.e., the first frame 610 and the second frame 620) may not be large. However, when shooting is made, the difference between the RGB grayscale values included in the area of interest of the two adjacent frames (i.e., the first frame 610 and the second frame 620) may increase rapidly due to a shooting effect 621 generated from the muzzle.

If the difference between the RGB grayscale values included in the area of interest 30 of the two adjacent frames (i.e., the first frame 610 and the second frame 620) is equal to or greater than a threshold value, the light-emitting state of the plurality of LEDs 140 may be controlled based on the RGB grayscale values included in the area of interest 30 of the second frame 620.

Through the above, the display apparatus 100 may provide a lighting effect corresponding to a frame in which an effect to which the user reacts sensitively, such as the shooting effect 621, occurs, increasing the user's immersion in the game content.

Figure 7A:
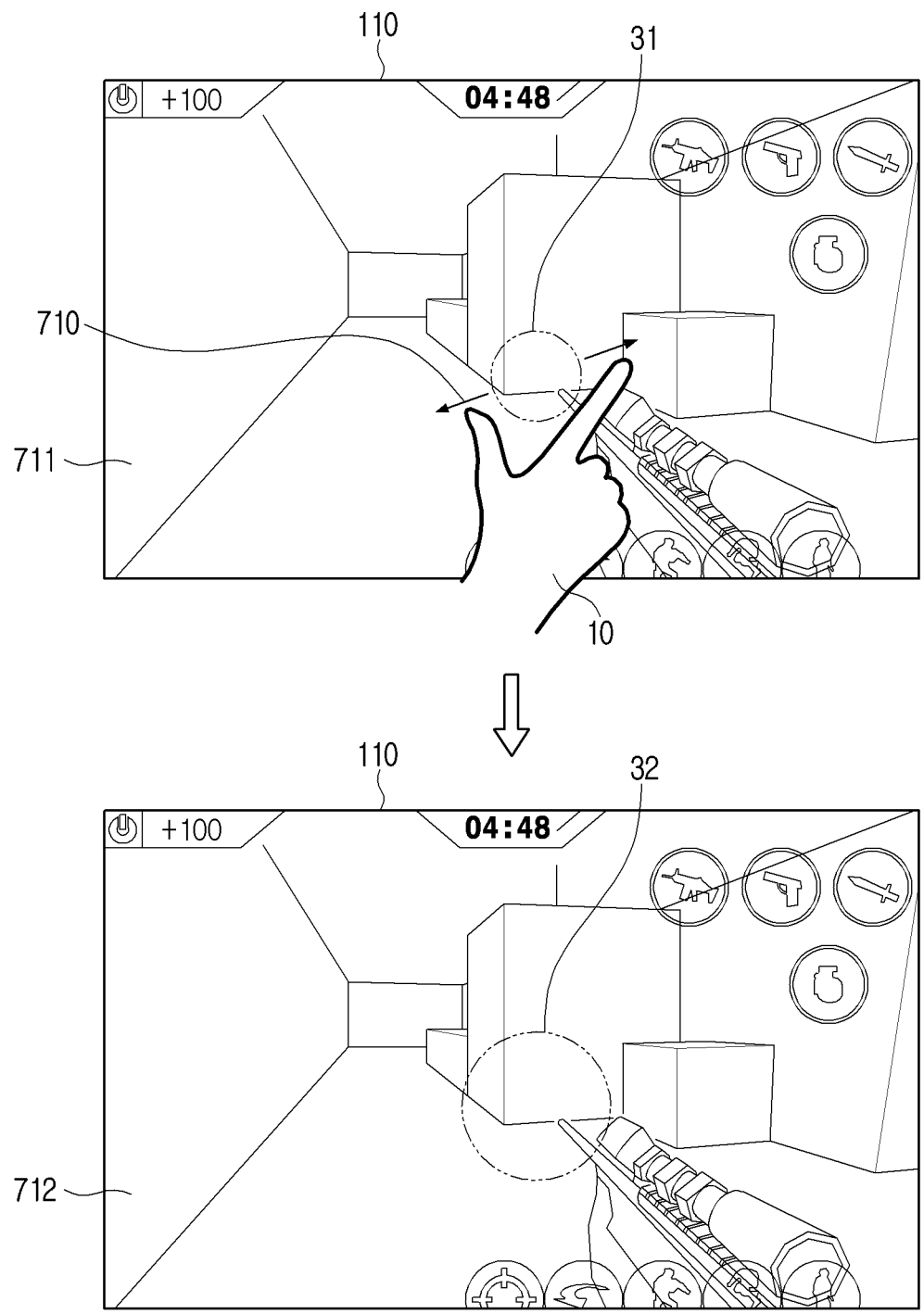
FIGS. 7A and 7B are views provided to illustrate an operation of changing an area of interest of a display apparatus according to various embodiments of the disclosure.
Figure 7B:
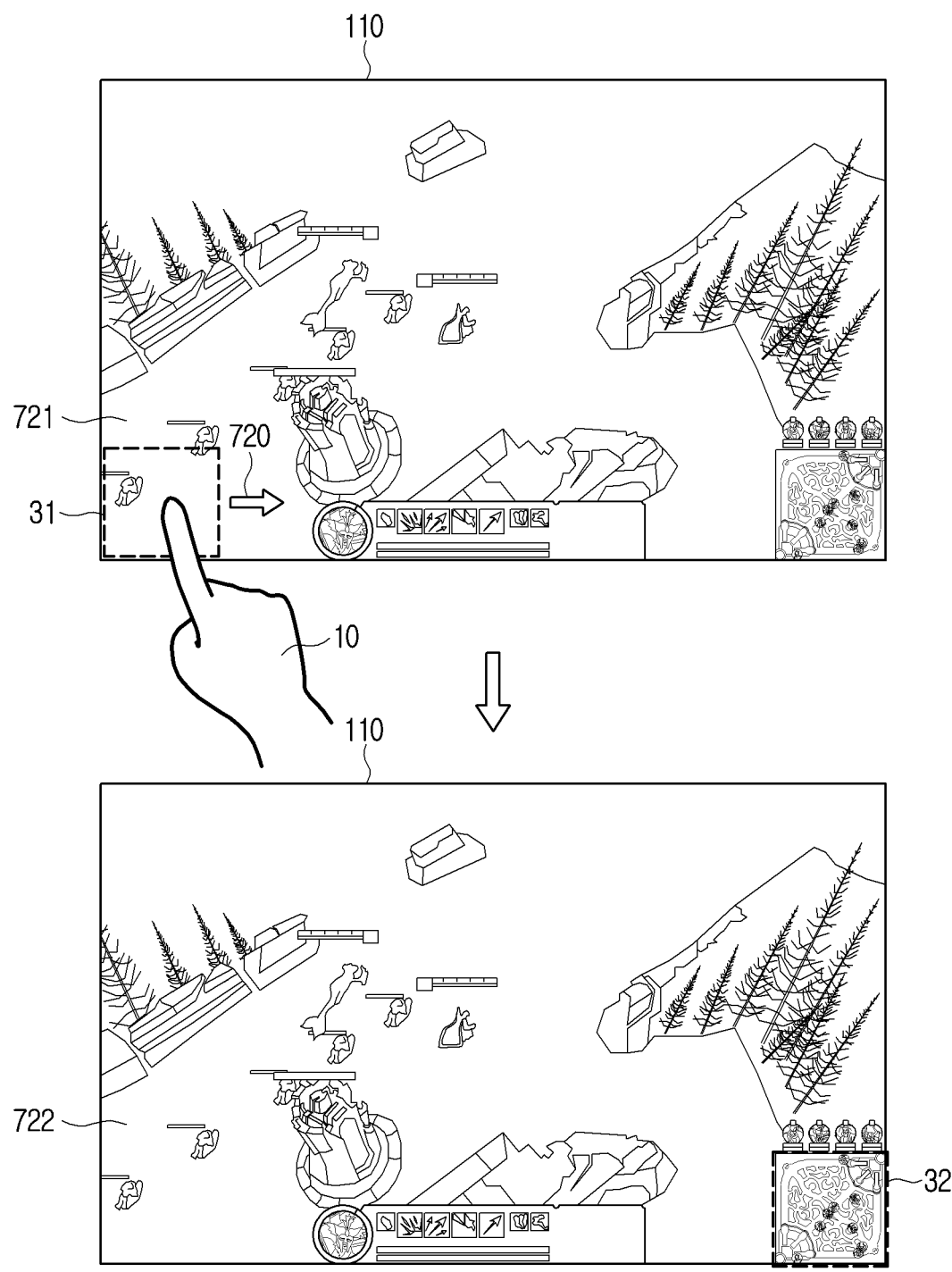

FIGS. 7A and 7B are views provided to illustrate an operation of changing an area of interest of a display apparatus according to various embodiments of the disclosure.

When the user 10 wishes to change at least one of the size or location of the area of interest for each predetermined game type, a user command to change the area of interest of a specific game type may be input through the user interface 120.

Referring to FIG. 7A, when a game image 711 of the FPS type is provided through the display 110, the processor 150, according to an embodiment of the disclosure, may identify the center area of the image 711 as the area of interest 31.

When a user command 710 to change the area of interest of the FPS type is input through the user interface 120, the processor 150 may update information regarding the area of interest corresponding to the FPS type stored in the memory 130 based on the user command 710.

If the user command 710 is a command to enlarge the size of the existing area of interest 31, the processor 150 may store information regarding the area of interest 32 enlarged based on the user command 710 in the memory 130 as information regarding the area of interest corresponding to the FPS type.

As a result, the processor 150 may control at least one of the color or brightness of the plurality of LEDs 140 based on RGB grayscale data of pixels included in the area of interest of which size is enlarged compared to the previous size in a game image 712 provided after the update is performed.

Referring to FIG. 7B, when a game image 721 of the MOBA type is provided through the display 110, the processor 150, according to an embodiment of the disclosure, may identify a lower left area of the image 721 as the area of interest 31.

When a user command 720 to change the area of interest of the MOBA type is input through the user interface 120, the processor 150 may update information regarding the area of interest corresponding to the MOBA type stored in the memory 130 based on the user command 720.

If the user command 720 is a command to move the existing location of the area of interest 31, the processor 150 may store information regarding the area of interest 32 which is moved based on the user command 720 as information regarding the area of interest corresponding to the MOBA type.

As a result, the processor 150 may control at least one or a size or a brightness of the plurality of LEDs 140 based on RGB grayscale data or pixels included in the area of interest 32 which is moved to a location different from the previous location in a game image that is provided after update is performed.

FIGS. 7A and 7B illustrate that the user command 10 inputs a user command through a touch input, but the disclosure is not limited thereto. The user 10 may transmit a control signal corresponding to a user command for changing the area of interest to the display apparatus 100 by manipulating a remote control device (not illustrated).

Figure 8:
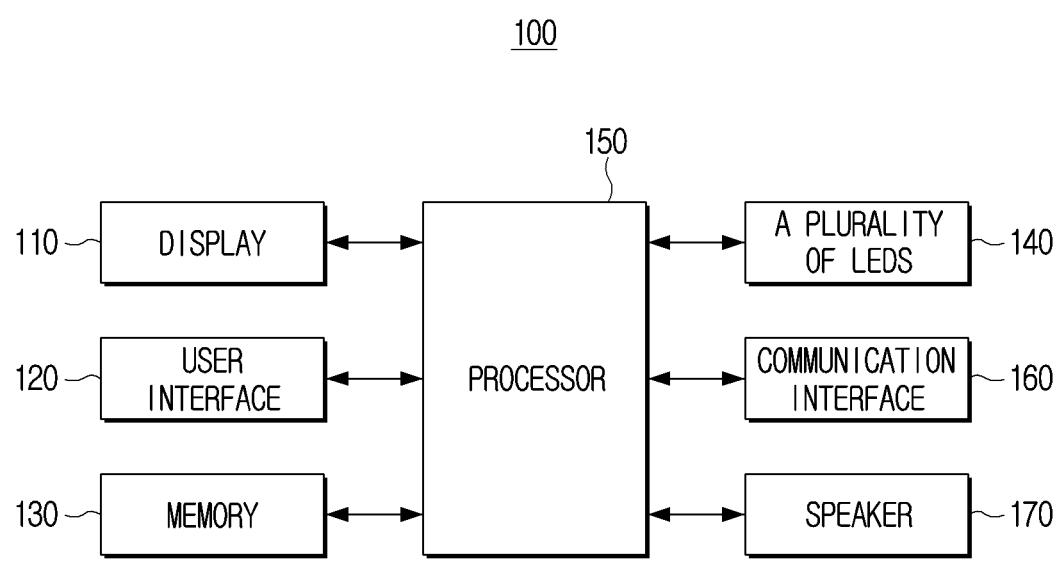
FIG. 8 is a block diagram provided to specifically illustrate a functional configuration of a display apparatus according to an embodiment of the disclosure.

FIG. 8 is a block diagram provided to specifically illustrate functional configuration of a display apparatus according to an embodiment of the disclosure.

Referring to FIG. 8, the display apparatus 100 may include the display 110, the user interface 120, the memory 130, the plurality of LEDs 140, the processor 150, a communication interface 160, and a speaker 170. The detailed description of the components illustrated in FIG. 8 which are overlapped with those illustrated in FIG. 2 will be omitted.

The communication interface 160 may input and output data of various types. For example, the communication interface 160 may transmit/receive various types of data to and from the display apparatus 100 through a communication method, such as AP-based wireless LAN network (Wi-Fi), Bluetooth™, Zigbee, a wired/wireless local area (LAN), a wide area network (WAN), ethernet, institute of electrical and electronics engineers (IEEE) 1394, a high-definition multimedia interface (HDMI), a universal serial bus (USB), a mobile high-definition link (MHL), audio engineering society/European broadcasting union (AES/EBU), optical, coaxial, or the like. More particularly, the processor 150 may control the communication interface 160 to receive information regarding a content provided through the display 110. In addition, the processor 150 may control the communication interface 160 to transmit information regarding the provision of the lighting effect to a user terminal (not illustrated).

The speaker 170 is a device for converting an electroacoustic signal corresponding to the audio generated from the processor 150 and provided by the display apparatus 100 into sound waves. The speaker 170 may include a permanent magnet, a coil and a diaphragm, and may output sound by vibrating the diaphragm by electromagnetic interaction between the permanent magnet and the coil. For example, the processor 150 may control the speaker 170 to output audio corresponding to a game image provided through the display 110.

Figure 9:
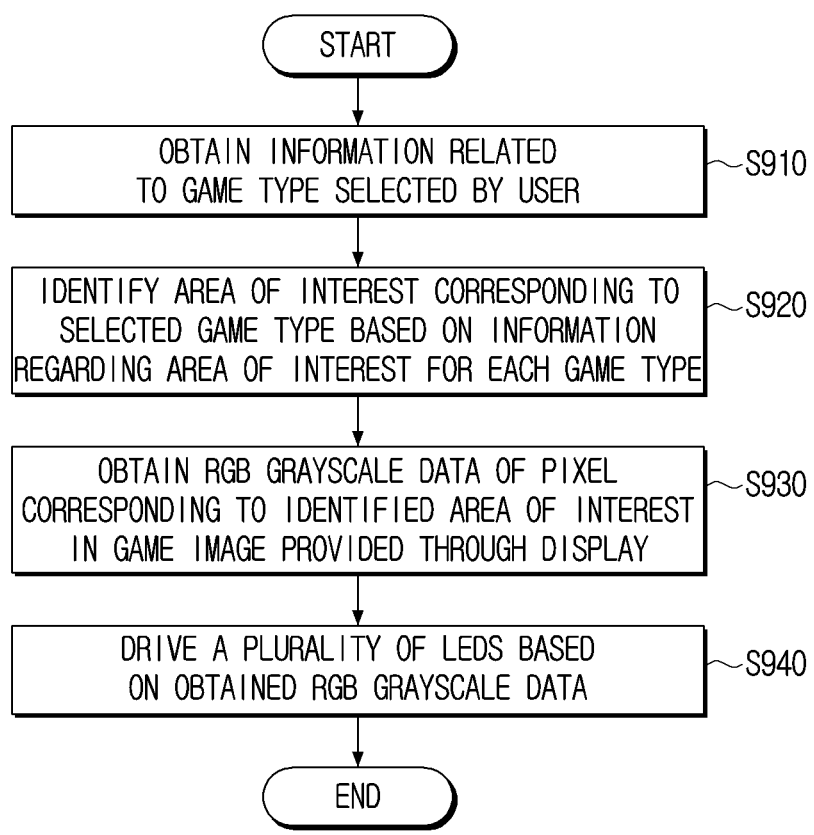
FIG. 9 is a flowchart provided to illustrate a controlling method according to an embodiment of the disclosure.

FIG. 9 is a flowchart provided to illustrate a controlling method according to an embodiment of the disclosure.

Referring to FIG. 9, the controlling method, according to an embodiment of the disclosure, includes obtaining information related to a game type selected by the user at operation S910.

Subsequently, an area of interest corresponding to the selected game type is identified based on information regarding an area of interest for each game type at operation S920.

Then, RGB grayscale data of a pixel corresponding to the identified area of interest in a game image provided through the display is obtained at operation S930.

Lastly, a plurality of LEDs may be driven based on the obtained RGB grayscale data at operation S940.

Here, in an operation of obtaining RGB grayscale data at operation S930, RGB grayscale data of a pixel included in the area of interest may be obtained in units of a predetermined first time section, and in an operation of driving a plurality of LEDs at operation S940, the plurality of LEDs may be driven based on the obtained RGB grayscale data.

In addition, an operation of driving a plurality of LEDs at operation S940 may include obtaining an average value of an R grayscale value, an average value of a G grayscale value and an average value of a B grayscale value of pixels included in the area of interest and driving a plurality of LEDs based on the R average value, the G average value and the B average value.

In addition, an operation of driving a plurality of LEDs at operation S940 may include identifying a range to which a pixel value of the area of interest belongs from among a plurality of pixel value ranges based on RGB grayscale data included in the area of interest and driving a plurality of LEDs based on a representative light-emitting value corresponding to the identified range.

Here, the plurality of LEDs include a first LED provided on a bezel area of a display and a second LED provided on a rear side of the display, and an operation of driving a plurality of LEDs at operation S940 may include identifying a first range and a second range to which a pixel value of the area of interest belongs from among the plurality of pixel value ranges based on the RGB grayscale data included in the area of interest and driving the first LED based on a first representative light-emitting value corresponding to the first range and the second LED based on a second representative light-emitting value corresponding to the second range.

Meanwhile, an operation of obtaining RGB grayscale data at operation S930 may include obtaining first RGB grayscale data included in the area of interest of a first frame included in a game image and second RGB grayscale data included in the area of interest of a second frame, and an operation of driving a plurality of LEDs at operation S940 may include, based on a difference between a pixel value included in the second frame and a pixel value included in the first frame being equal to or greater than a threshold value based on the first RGB grayscale data and the second RGB grayscale data, driving the plurality of LEDs based on the pixel value included in the second frame.

In addition, information regarding an area of interest for each game type may include information regarding different locations of an image for each game type, and the different locations of the image may include at least one of a center area, a lower left area or a lower right area of the image.

In addition, the controlling method may further include, based on a user command to change the area of interest of a specific game type being input, updating information regarding the area of interest corresponding to the specific game type based on the user command.

Further, an operation of driving a plurality of LEDs at operation S940 may include adjusting at least one of a color or a brightness of the plurality of LEDs based on RGB grayscale data of a pixel corresponding to the identified area of interest.

Meanwhile, the methods according to the diverse embodiments of the disclosure described above may be implemented in the form of an application that may be installed in an existing display apparatus.

In addition, the methods according to the diverse embodiments of the disclosure described above may be implemented only by software upgrade or hardware upgrade for the existing display apparatus.

Further, the diverse embodiments of the disclosure described above may also be performed through an embedded server included in the display apparatus or at least one external server.

Meanwhile, the above-described various embodiments may be implemented in a recording medium that is readable by a computer or a similar device using software, hardware of a combination thereof. In some cases, the embodiments described in the disclosure may be implemented by the processor 150 itself. According to software implementation, the embodiments, such as procedures and functions described in the disclosure may be implemented by separate software modules. Each of the software modules may perform one or more functions and operations described in the disclosure.

The computer instructions for performing the processing operation of the display apparatus 100 according to the above-described various embodiments of the disclosure may be stored in a non-transitory computer-readable medium. The computer instructions stored in such a non-transitory computer-readable medium may cause a specific device to perform the processing operation of the display apparatus 100 according to the above-described various embodiments when they are executed by the processor of the specific device.

The non-transitory computer readable medium is not a medium that stores data for a while, such as a register, a cache, a memory, or the like, but means a medium that semi-permanently stores data and is readable by an apparatus. Specifically, the non-transitory readable medium may include a compact disc (CD), a digital versatile disc (DVD), a hard disc, a Blu-ray disc, a universal serial bus (USB), a memory card, a read only memory (ROM), or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
 a display;
 a user interface;
 a memory storing information regarding an area of interest for each game type, respectively, and a representative light-emitting value for each of a plurality of pixel value ranges;
 a plurality of light emitting diodes (LEDs) provided on one area of the display and configured to emit light in various colors; and
 a processor configured to:
  based on information related to a game type being selected through the user interface, identify an area of interest corresponding to the selected game type based on the information stored in the memory,
  control a light-emitting state of the plurality of LEDs based on red, green, and blue (RGB) grayscale data of a pixel corresponding to the identified area of interest in a game image provided through the display,
 wherein the plurality of LEDs comprise a first LED and a second LED, each located in a different area of the display apparatus,
 wherein the processor is further configured to:
  identify a first range and a second range to which a pixel value of the area of interest belongs from among the plurality of pixel value ranges based on RGB grayscale data included in the area of interest,
  control a light-emitting state of the first LED based on a first representative light-emitting value corresponding to the first range, and
  control a light-emitting state of the second LED based on a second representative value corresponding to the second range,
 wherein the first range comprises a pixel value range to which most pixels belong, and
 wherein the second range comprises a pixel value range to which next most pixels belong.

2. The display apparatus of claim 1, wherein the processor is further configured to:
 obtain RGB grayscale data of a pixel included in the area of interest in units of a predetermined first time section, and
 control the light-emitting state of the plurality of LEDs for a predetermined second time section based on the obtained RGB grayscale data.

3. The display apparatus of claim 1, wherein the processor is further configured to:
 obtain an average value of a red (R) grayscale value, an average value of a green (G) grayscale value, and an average value of a blue (B) grayscale value of respective pixels included the area of interest, and
 control the light-emitting state of the plurality of LEDs based on the average value of the R grayscale value, the average value of the G grayscale value, and the average value of the B grayscale value.

4. The display apparatus of claim 1, wherein the first LED is provided on a bezel area of the display and the second LED is provided on a rear side of the display.

5. The display apparatus of claim 1, wherein the processor is further configured to:
 obtain first RGB grayscale data included in an area of interest of a first frame included in the game image and second RGB grayscale data included in an area of interest of a second frame included in the game image, and
 based on a difference between a pixel value included in the second frame and a pixel value included in the first frame being equal to or greater than a threshold value based on the first RGB grayscale data and the second RGB grayscale data, control the light-emitting state of the plurality of LEDs according to the pixel value included in the second frame.

6. The display apparatus of claim 1, wherein the processor is further configured to:
 based on a user command for changing an area of interest of a specific game type being input, update information regarding the area of interest corresponding to the specific game type stored in the memory based on the user command.

7. The display apparatus of claim 1, wherein the processor is further configured to:

control at least one of a color or a brightness of the plurality of LEDs based on RGB grayscale data of a pixel corresponding to the identified area of interest.

8. The display apparatus of claim 1, wherein the processor is further configured to:
based on the game type being a first shooter person game type, identify that the area of interest is a center area of the game image, and
based on the game type being a multiplayer online battle arena game type, identify that the area of interest is at least one of a lower left area of the game image or a lower right area of the game image.

9. The display apparatus of claim 1,
wherein the information regarding an area of interest for each game type includes information regarding different locations of an image for each game type, and
wherein the different locations of the image include at least one of a center area of the image, a lower left area of the image, or a lower right area of the image.

10. A method of controlling a display apparatus, the method comprising:
based on information related to game type being selected, identifying an area of interest corresponding to the selected game type based on information regarding an area of interest for each game type;
driving a plurality of light emitting diodes (LEDs) based on red, green, and blue (RGB) grayscale data of a pixel corresponding to the identified area of interest in a game image provided through a display, wherein the plurality of LEDs comprise a first LED and a second LED, each located in a different area of the display apparatus;
identifying a first range and a second range to which a pixel value of the area of interest belongs from among a plurality of pixel value ranges based on RGB grayscale data included in the area of interest;
driving the first LED based on a first representative light-emitting value corresponding to the first range; and
driving the second LED based on a second representative light-emitting value corresponding to the second range,
wherein the first range comprises a pixel value range to which most pixels belong, and
wherein the second range comprises a pixel value range to which next most pixels belong.

11. The method of claim 10, wherein the driving of the plurality of LEDs comprises:
obtaining RGB grayscale data of a pixel included in the area of interest in units of a predetermined first time section; and
driving the plurality of LEDs for a predetermined second time section based on the obtained RGB grayscale data.

12. The method of claim 10, wherein the driving of the plurality of LEDs comprises:
obtaining an average value of a red (R) grayscale value, an average value of a green (G) grayscale value, and an average value of a blue (B) grayscale value of respective pixels included the area of interest; and
driving the plurality of LEDs based on the average value of the R grayscale value, the average value of the G grayscale value, and the average value of the B grayscale value.

13. The method of claim 10, wherein the first LED is provided on a bezel area of the display and the second LED is provided on a rear side of the display.

14. The method of claim 10, wherein the driving of the plurality of LEDs comprises:
obtaining first RGB gray scale data included in an area of interest of a first frame included in the game image and second RGB grayscale data included in an area of interest of a second frame included in the game image; and
based on a difference between a pixel value included in the second frame and a pixel value included in the first frame being equal to or greater than a threshold value based on the first RGB grayscale data and the second RGB grayscale data, driving the plurality of LEDs based on the pixel value included in the second frame.

15. The method of claim 10, further comprising:
based on a user command for changing an area of interest of a specific game type being input, updating information regarding the area of interest corresponding to the specific game type stored in a memory based on the user command.

16. The method of claim 10, further comprising:
driving at least one of a color or a brightness of the plurality of LEDs based on RGB grayscale data of a pixel corresponding to the identified area of interest.

17. The method of claim 10,
wherein the information regarding an area of interest for each game type includes information regarding different locations of an image for each game type, and
wherein the different locations of the image include at least one of a center area of the image, a lower left area of the image, or a lower right area of the image.

18. At least one non-transitory computer readable storage medium storing one or more computer programs including instructions which, when executed by at least one processor, cause the at least one processor to:
based on information related to a game type being selected through a user interface, identify an area of interest corresponding to the selected game type based on information stored in a memory;
control a light-emitting state of a plurality of light emitting diodes (LEDs) based on red, green, and blue (RGB) grayscale data of a pixel corresponding to the identified area of interest in a game image provided through a display, wherein the plurality of LEDs comprise a first LED and a second LED, each located in a different area of a display apparatus;
identify a first range and a second range to which a pixel value of the area of interest belongs from among a plurality of pixel value ranges based on RGB grayscale data included in the area of interest;
control a light-emitting state of the first LED based on a first representative light-emitting value corresponding to the first range; and
control a light-emitting state of the second LED based on a second representative value corresponding to the second range,
wherein the first range comprises a pixel value range to which most pixels belong, and
wherein the second range comprises a pixel value range to which next most pixels belong.

* * * * *